United States Patent
Chiavacci et al.

(10) Patent No.: US 9,399,601 B2
(45) Date of Patent: Jul. 26, 2016

(54) ADDITIVES FOR CERAMIC GLAZES

(75) Inventors: Dario Chiavacci, Castronno (IT); Mattia Canziani, Gavirate (IT); Stefano Crespi, Busto Arsizio (IT); Laura Vigano', Parabiago (IT); Giovanni Floridi, Novara (IT); Giuseppe Li Bassi, Gavirate (IT)

(73) Assignee: LAMBERTI SPA, Albizzate (VA) (IT)

( * ) Notice: Subject to any disclaimer, the term of this patent is extended or adjusted under 35 U.S.C. 154(b) by 43 days.

(21) Appl. No.: 14/236,550

(22) PCT Filed: Jul. 20, 2012

(86) PCT No.: PCT/EP2012/064331
§ 371 (c)(1),
(2), (4) Date: Jan. 31, 2014

(87) PCT Pub. No.: WO2013/017445
PCT Pub. Date: Feb. 7, 2013

(65) Prior Publication Data
US 2014/0165875 A1 Jun. 19, 2014

(30) Foreign Application Priority Data
Aug. 1, 2011 (IT) .......................... VA2011A000023

(51) Int. Cl.
C03C 1/04 (2006.01)
C04B 41/86 (2006.01)
C04B 41/83 (2006.01)
C03C 8/14 (2006.01)
C04B 41/00 (2006.01)
C04B 41/50 (2006.01)

(52) U.S. Cl.
CPC . *C04B 41/83* (2013.01); *C03C 8/14* (2013.01); *C04B 41/009* (2013.01); *C04B 41/5022* (2013.01); *C04B 41/86* (2013.01)

(58) Field of Classification Search
CPC ........................................................ C09C 1/42
See application file for complete search history.

(56) References Cited

U.S. PATENT DOCUMENTS

| | | | | |
|---|---|---|---|---|
| 4,542,031 A * | 9/1985 | Nakajima | ............... | A23K 1/003 426/307 |
| 5,238,881 A * | 8/1993 | Norris | ....................... | C03C 8/14 106/312 |
| 5,401,309 A | 3/1995 | Chopin et al. | | |
| 5,589,222 A * | 12/1996 | Thometzek | ............... | C03C 8/00 264/123 |
| 5,968,247 A | 10/1999 | Macaudiere | | |
| 2002/0028288 A1* | 3/2002 | Rohrbaugh | ............ | B01J 39/043 427/180 |
| 2006/0018968 A1* | 1/2006 | Melbouci | ................. | A23L 1/05 424/488 |
| 2010/0266817 A1* | 10/2010 | Hirst | ......................... | C03C 8/00 428/161 |
| 2012/0315401 A1* | 12/2012 | Prampolini | ............... | C03C 8/16 427/387 |
| 2013/0150229 A1* | 6/2013 | Crespi et al. | .................. | 501/141 |

FOREIGN PATENT DOCUMENTS

| | | | |
|---|---|---|---|
| EP | 346097 | A2 | 12/1989 |
| EP | 620254 | A1 | 10/1994 |
| EP | 628608 | A1 | 12/1994 |
| EP | 680930 | A1 | 11/1995 |
| EP | 1083155 | A1 | 3/2001 |

* cited by examiner

*Primary Examiner* — Melvin C Mayes
*Assistant Examiner* — Colette Nguyen
(74) *Attorney, Agent, or Firm* — Mossman, Kumar & Tyler PC

(57) ABSTRACT

Use of extruded pellets comprising carboxymethyl cellulose and at least another ceramic glaze additive for the preparation of ceramic glaze slips.

12 Claims, No Drawings

ADDITIVES FOR CERAMIC GLAZES

FIELD OF THE INVENTION

The present invention relates to the use for the preparation of ceramic glaze slips of extruded pellets comprising a carboxymethyl cellulose and at least another ceramic glaze additive.

The glaze slips so obtained may be applied on green or fired ceramic bodies such as artware, tableware, tiles, roofing tiles, bricks, heavy clay products and sanitary ware.

BACKGROUND OF THE ART

Most traditional ceramic manufactured products, such as tiles and sanitary ware, are made of a ceramic body that confers shape and mechanical properties to the object; the ceramic body generally has some porosity and poor aesthetic qualities.

Said ceramic body, which is defined "green" or, alternatively, "fired", is usually coated with a ceramic layer, called ceramic glaze; the ceramic glaze is sintered by firing, in such a way to gain suitable superficial aesthetic qualities and, in the meantime, to become a fluid-proof barrier; as a matter of fact, after firing, the ceramic glaze has usually no porosity and is generally resistant to abrasion and to the attack of chemical agents.

Glaze is mainly applied on the surface of the ceramic body dispersed/suspended in a opportune vehicle, usually water, or, in some special application, by dry dusting a dry mixture over the surface of the ceramic body. Traditional liquid ceramic glazes are suspensions of various powdered minerals and metal oxides that can be applied by directly dipping pieces into the glaze, pouring the glaze over the piece, spraying it onto the piece with an airbrush or similar tool, with a brush, or with any tool that will achieve the desired effect.

Liquid ceramic glazes, also called ceramic glaze slips, generally contain, finely dispersed in water, silica to form glass, also in form of frit (pre-fired vitreous component); mixtures of metal oxides, usually in the form of pre-treated natural occurring minerals, such as alkaline earth metal oxides which act as a flux and allow the glaze to melt at a particular temperature; alumina to stiffen the glaze and prevent it from running off the piece; ceramic pigments, such as oxides or carbonates of transition metals.

Since most of the ingredients cited above are heavy ingredients and in order to obtain a proper coating before and after firing, it is necessary to add some particular additive into the liquid ceramic glazes. These additives, often organic in nature, are added, singularly or as compositions, to glazes to give them specific properties that are required during application. They do not participate directly to the vitrification process, but are able to give special characteristics to the glaze slip useful for the subsequent application on the ceramic body or to the formed glass for successive treatments.

These ceramic glaze additives are well known in the art and further information can be found in literature, for example in Fortuna D., "Sanitaryware", Gruppo Editoriale Faenza Editrice, p. 61-64 (2000) and Stefanov S. and Batscharow S., "Ceramic Glazes", Bauverlag GmbH (1989).

The most common additives for ceramic glazes are: suspending agents, such as water-swellable clays; thickening agents, such as carboxymethyl cellulose, alginates, natural gums and acrylic (co)polymers; preservatives, biocides, antifoams, dispersants (fluidizers), such as medium/low molecular weight acrylic acid (co)polymer; binders; deflocculants; levelling agents and plasticizers.

Many of these additives are added into the glaze slips as powders. Powders by their nature have very large surface areas susceptible to humidity and/or bacterial growth.

Handling of such powders and dust generation during processing create environmental and health problems that must be dealt with by the manufacturer and the customer.

In addition suspending agents and thickening agents in form of powders are difficult to dissolve in the thick glaze slip and, if not stirred for enough time and/or with a high shear mixer, they can create lumps or aggregates in the glaze slip. After preparation, the glaze slips are sieved in order to eliminate residual impurities and aggregates. If not completely dissolved, the lumps or aggregates of the additives can increase considerably the time required for the sieving. Moreover, a partial dissolution of the rheology modifier can require a time-consuming correction of the viscosity of the glaze slip or, if not corrected, can cause serious glazing defects on the final products, such as leveling problems, running or crawling, which are well known to those expert in the art.

Furthermore the exact dosing and in-loading of the powdery additives, which have usually different densities and different particle sizes, are source of further difficulties.

A typical solution to these problems commonly used in many fields is to granulate the powdery compounds or compositions. Unfortunately the granules obtained during the granulation process are different in their forms and dimensions, thus making it necessary to sieve the granulated material, for the purpose of selecting the granules presenting dimensions above a minimum value. Moreover granulation does not eliminate dust. In fact, a percentage of this dust, even if small, remains imprisoned in between the granules and tends to spread itself.

It has now been found that the use of compositions of these additives in form of extruded pellets can solve all the above mentioned difficulties. The composition and dimensions of the pellets can be easily controlled in order to avoid hazard and to optimize processing, handling/shipping, in-loading dosing, etc. At the same time the extruded pellets are really compact and do not produce dust when handled and have a low dissolution rate, compared to the powders, which reduce significantly the formation of lumps in the glaze slip.

As far as the Applicant knows, the use of extruded pellets obtained by extrusion of a mixture of two or more ceramic glaze additives for the preparation of glaze slips have not been described in the literature.

By "pellet", we mean any solid shaped composition, including but not limited to, tablets, pearls, flakes, briquettes, bars, or blocks.

DESCRIPTION OF THE INVENTION

It is therefore a fundamental object of the present invention the use of extruded pellets comprising: a) from 5 to 85% by weight as dry matter of a carboxymethyl cellulose (CMC), b) from 5 to 85% by weight as dry matter of at least another ceramic glaze additive, in which the sum of a) +b) represents at least 40% by weight of their dry matter, for the preparation of ceramic glaze slips, the pellets being used in an amount comprised between 0.05% and 5% by weight based on the weight of the ceramic glaze slip.

DETAILED DESCRIPTION OF THE INVENTION

Preferably the extruded pellets of the invention comprise: a) from 20 to 75% by weight as dry matter of a CMC and b) from 20 to 75% by weight as dry matter of at least another ceramic glaze additive.

The carboxymethyl cellulose a) suitable for the realization of the present invention can be chosen among those commonly used in the ceramic field and known to those expert in the art. The carboxymethyl cellulose preferred for the realization of the present invention has a degree of substitution comprised between 0.5 and 1.5, more preferably between 0.6 and 1.2, most preferably from 0.7 to 1.1. Its Brookfield LVT® viscosity, at 2% wt (weight) in water, 60 rpm and 20° C., is comprised between 5 and 30,000 mPa*s, preferably between 10 and 15000 mPa*s.

The carboxymethyl cellulose useful for the realization of the present invention can be technical or purified carboxymethyl cellulose, having a percentage of active substance comprised between 55 and 99.5% by weight on dry matter, preferably from 70 to 98.5, and a content of water of about 2-12% by weight.

The ceramic glaze additive b) is preferably chosen in the group consisting of suspending agents, thickening agents different from CMC, preservatives, biocides, antifoams, dispersants, binders, deflocculants, levelling agents, plasticizers, de-airing agents and mixture thereof.

Suspending agents improve the stability and the flowability of the dispersion and also permit a higher percentage of suspended solids to be incorporated into the dispersion. Suitable suspending agents are water swellable clays and sodium or magnesium chloride. Water-swellable clays are the preferred suspending agents. With the expression "water-swellable clays" we mean clays which are capable of adsorbing water.

Examples of these clays are bentonite, montmorillonite, kaolinite, hectorite, attapulgite, smectite and others. The most popular clay is standard Bentonite, which may contain small amount of iron. Another useful clay is Hectorite, which is very plastic and iron-free and belongs to the family of the smectite minerals. It is sold under various commercial names, including Bentone®, Hectabright®, Macaloid® and Vee-Gum®. Also synthetic smectites can be used for the same purpose.

Suitable thickening agents different from CMC, which have binding, film-forming, suspending and water retention properties, are naturally occurring water-soluble polymer, as such or synthetically derivatized, such as starch and starch derivatives, guar and guar derivatives, tamarind and its derivatives, xanthan gum, alginates, diutan gum, gum Arabic, and gum tragacanth. Cellulose and cellulose derivatives different from CMC, such as hydroxyethyl cellulose, hydroxypropyl cellulose, methyl hydroxypropyl cellulose, can be also used. Further suitable thickening agents are synthetic polymers such as a high molecular weight acrylic acid based polymer or polyvinyl pyrrolidone and its copolymers. Also mixtures of thickening agents can be advantageously used.

As its name suggests, the dispersant ensures that the solid is uniformly dispersed throughout the aqueous medium. Any of the dispersants which are normally used for ceramic slurries are useful in the preparation of the pellets of the present invention. Examples of these dispersants are water-soluble salts of low/medium molecular weight acrylic (co)polymers, such as (meth)acrylic acids homopolymers; polyphosphates, for example tripolyphosphate and hexametaphosphate; humic acids; lignin sulfonates; sodium silicates; sodium carbonate and mixture thereof. Preferred dispersants are water-soluble salts of low/medium molecular weight acrylic (co)polymers and polyphosphates.

Suitable biocides and preservatives are, for example, p-chloro-m-cresol, o-phenyl phenol, 2-bromo-2-nitropropane-1,3-diol (Bronopol) or compounds from the class of the derivatized isothiazolin-3-ones such as benzisothiazolinone (BIT), 5-chloro-2-methyl-4-isothiazolin-3-one (CIT or CMIT) and 2-methyl-4-isothiazolin-3-one (MIT). Other examples are sodium or zinc pyrithione, parabens, sodium benzoate, formaldehyde releasers etc. They are used both in the form of powders and liquid also as synergistic mixtures.

Example of antifoams and de-airing agents suitable for the realization of the present invention are aluminum stearate, ethylene/propylene oxide copolymers, polydimethyl siloxane, colloidal silica, mineral oils and mixture thereof.

Example of binders which can be used in the present invention are polyvinyl alcohol, polyvinyl acetate or partially hydrolyzed polyvinyl acetate, anionic polyacrilates or polyacrylamides, polyurethanes, styrene/butadiene resins and mixture thereof.

Plasticizer are usually added to reduce the elastic modulus of the glaze slips and its internal stress during the firing, thus decreasing the probability of craking formation. Examples of plasticizer are glycerol, sorbitol, glycols, such as triethylene glycol or propylene glycol, (co)polymers ethylene oxide/propylene oxide; fatty acids or fatty amides; alkanol amines such as triethanol amine; fatty acid monoesters of glycerol or glycols; esters such as monobutyl or dibutyl phthalate; and mixture thereof. Preferred plasticizers are polyethylene and/or polypropylene glycols.

Other ingredients that can be advantageously added to the extruded pellets of the invention are fillers; disintegrating agents such as polyvinylpyrrolidone, dextran and starch or mixture of carboxylic acids, for example citric or tartaric acid, and water soluble carbonate or bicarbonate, i.e. sodium carbonate; extrusion plasticizers such as ethyl cellulose and polyethylene glycol.

The method of preparation of the extruded pellets of comprises the following phases:
1) preparing a hydrated mixture of a) and b);
2) extruding the hydrated mixture to form an extruded material;
3) comminuting the resulting extruded material to form a shaped product (pellets).

By conventional means, the CMC, water and the ceramic additives are mixed to form a hydrated mixture (phase 1). This can be done in an external mixing device and/or inside the extruder.

The water content of the hydrated mixture is only important in that it should be high enough to allow the intimate and uniform mixing of the different components and should permit the extrusion of the mixture. Conversely, the water content of the hydrated mixture should not be so high that the it does not maintain its shape after it is extruded. Generally, the water content of the hydrated mixture is from 5.0 to 50 by weight.

The material in the extruder is heated to or maintained at a temperature in the range from about 20 to about 100° C. The optimum temperature for extrusion will vary somewhat dependent upon the components of the mixture, but the optimum temperature can readily be determined empirically. The temperature of the mixture may vary depending upon where it is in the extruder, but generally a uniform temperature profile is preferred. The temperature referred to herein is the mixture temperature in the extruder just before it passes through the die. High temperatures which can cause decomposition should be avoided.

The hydrated mixture is extruded through a die, preferably a multihole die. In general, the shape and size of the orifices fix the cross-sectional shape and size of the extrudate. Although any shape of orifice may be used, i.e. circle, triangle, square, or rectangle, it is preferred that the extrusion of the hydrated mixture be through equiaxial orifices. Equiaxial orifices are orifices that have approximately equal dimensions in all directions. The cross-sectional area of the orifices should be small enough so that the extruded hydrated mixture fibers line up parallel to each other in a tightly formed filaments (strands). On the other hand, the cross-sectional area of the orifice should not be so small that an excessive amount of energy must be exerted to press the hydrated mixture through the orifices. Generally, the orifices are of dimensions ranging from 1.0 to 6.0 mm, preferably from 2.0 to 3.5 mm.

The extrusion can be done with any device that applies sufficient pressure to push the hydrated mixture through the extrusion orifices at a temperature which keeps the mixture hydrated. For example, a pump-type extruder, such as a positive displacement piston or a gear pump, can be used. Another example of suitable extrusion equipment is a screw-type extruder which advances the hydrated mixture by means of a screw rotating inside a cylinder. A twin screw extruder in co-rotating or counter-rotating mode, intermeshing or non-intermeshing may be utilized in the processes of the invention, but equally a single screw extruder or a multi screw extruder may also be suitable providing always that mixing can be achieved. Screw-type extruders are not as energy efficient as pump-type extruders and convert much of the energy to heat. This causes the temperature of the mixture to increase and dehydration occurs. Thus, when a screw-type extruder is used, it is generally necessary to use a cooling device to keep the hydrated mixture at a temperature below 100° C.

Usually the extrusion process is carried out at pressures well above atmospheric pressure, preferably the extrusion is carried out at pressures of from about 20 to about 160 bar.

The extruded material is a firm material appearing uniform in texture and color. Generally, the extruded material is in the form of long, narrow filaments. The filaments have a uniform cross-sectional area that is approximately the same as the extrusion orifices described above. The extruded material has a residual moisture content ranging from 5.0 to 50% by weight, preferably from 15 to 30% by weight.

In order to reduce the filaments into pellets, it is necessary to comminute the extrudate (phase 3).

The comminuting can be accomplished by using standard equipment known in the art. Typical comminuting devices are air-swept impact mills, ball mills, hammer mills, and disk mills. This is preferably done in an air-swept impact mill because the other mills, i.e. ball mills, have a tendency to overmill the product into fine particles that are dusty. In addition, an air-swept impact mill will dry the extruded material, if necessary, by blowing hot air across the mill.

Another method for comminuting the extruded material is to cut it with a die-faced cutter. A die-face cutter operates by moving a blade across the stationary die or by moving a die across the stationary blade. Thus, the ceramic additive is cut as it is extruded through the plurality of orifices in the die.

The size of the extrusion orifice fix two of the dimensions of the product. Therefore, it is only necessary to cut the filaments to shorten the length. Typically, the extruded material is cut to a length/diameter ratio of from 0.5 to 3, preferably to a length/diameter ratio of from 1 to 2.

It may be advantageous to dry the extruded pellets. The drying of the extruded material can be accomplished with standard drying equipment and methods known in the art. Typical driers include belt driers and fluid bed driers. The dried extruded pellets have a residual moisture content generally ranging from 5.0 to 15% by weight.

In a preferred embodiment the ceramic glaze slips contains from 0.2 to 3% by weight of the extruded pellets of the invention.

All glazes normally used in the ceramic industries and well known to those expert in the art can be prepared using the extruded pellets of the invention. Various examples of ceramic glaze formulations can be found in literature, such as in: Fortuna D., "Sanitaryware", Gruppo Editoriale Faenza Editrice, (2000) and Stefanov S. and Batscharow S., "Ceramic Glazes", Bauverlag GmbH (1989).

As already said, typical components of ceramic glazes are silica, fluxes, alumina and ceramic pigments.

Silica and alumina can be added to glazes by the addition of minerals, such as: quartz, flint, ball clay, kaolin, feldspars or mixtures thereof. Silica can be also added to the glaze in the form of frits, the term frit referring to that granulated or particulate material obtained when molten glass is poured into cold water. Frits are normally mixtures of various mineral materials containing among the others silica, alumina, metal oxides, boron oxide.

Fluxes lower the melting point of the glass formers. Non exhaustive examples of fluxes are alkali and alkali-earth oxides and carbonates.

The ceramic pigments useful in the ceramic glaze of the invention are solid sinterable materials. Examples of suitable ceramic pigments include iron, titanium, copper, chromium, zinc, magnesium, aluminum, cobalt, and cadmium oxides or salts, and zirconium and praseodymium silicates.

The extruded pellets of the invention can be added to the glaze in the mill during the grinding or during the preparation of the glaze slip, both as such or as a water dispersion at a concentration ranging from 1 to 30% wt; preferably they are added to the ceramic glaze slip components in dry form.

For liquid applications, glazes are normally ground and sieved, then are suspended in a vehicle such as water obtaining the glaze slip. The ratio between the solid materials and the vehicle is between 85/15 and 40/60 wt. Often grinding of the glazes is performed directly in the presence of the vehicle to provide the glaze slip in a single operation.

The extruded pellets of the invention can also be used for the preparation of engobes, which are a particular kind of glazes. An engobe is an opaque coating that is often applied to the ceramic body before glazing. Its function is to mask the ceramic body, for example, when it is produced using red clay. Engobes conventionally contain frits and raw materials but the frit content is typically much lower than in a normal glaze.

The glaze slip of the present invention may be applied on green or fired ceramic bodies such as artware, tableware, tiles, roofing tiles, bricks, heavy clay products and sanitaryware using anyone of the conventional application techniques known to those expert in the art. Application techniques such as disk and bell applications, dipping, spraying, screen printing, brushing and electrostatic applications can be employed.

The glaze slip of the invention is storage stable for several days without change of its rheological profile and can be used as if it was freshly prepared.

EXAMPLES

Examples 1-3

The solid ingredients of Table 1 were homogenized in a mixer, using a "K" shaped stirrer. During the homogenization, demineralized water was added slowly (in about 10 minutes) to the mixture avoiding to produce agglomerations of the material.

TABLE 1

| Ingredient | Example 1 (g) | Example 2 (g) | Example 3 (g) |
|---|---|---|---|
| Sodium Carboxymethyl Cellulose | 850 | 850 | 700 |
| Sodium Tripolyphosphate | 350 | 350 | 80 |
| ACTICIDE MBP | — | 131.3 | — |
| NaCl | — | — | 120 |
| BENTONITE | — | — | 220 |
| Demineralized water | 99.6 | 110 | 93 |

* active 74% on dry matter; DS 0.72; moisture 24% wt; Brookfield ® viscosity LVT (6% sol. as dry matter, 60 rpm, 20° C.) 300 mPa*sec.

The mixtures of Example 1-3 were transferred into a Bausano extruder equipped with 2 counter rotating screws, a multihole die with holes of 2.5 mm and a die-faced cutter.

The speed of the screws and the cutter was adjusted to produce about 50-80 g/min of pellets about 2.5 mm large and 2.6 mm long. The internal temperature and pressure during extrusion were around 60-70° C. and 130 bar respectively.

The extruded pellets were dried on fluid bed at 80° C. to obtain a residual moisture of about 7% wt.

Table 2 shows the results of dissolution test of 30 g of each mixture in 300 ml demineralized water under constant stirring with a magnetic bar stirrer.

The results are reported as the time required to reach the maximum Brookfield LVT viscosity measured at 25° C. and 60 rpm.

TABLE 2

|  | Time (min) |
|---|---|
| Example 1 | 80 |
| Example 2 | 80 |
| Example 3 | 120 |

The stability of the extruded pellets of Example 1-3 to mechanical stress was evaluated by shaking the pellets for 30 min in a tared stainless steel sieve (80 mesh) in the presence of hard sphere (2 cm o.d.) of silica.

At the end of the test the amount of powder which pass through the 80 mesh sieve was determined. For each sample the amount of powder was below 0.1%.

Applicative Test

The extruded pellets of Example 2 were compared with the same composition of Example 4 (see Table 3), prepared by simply physically mixing the different ingredients.

TABLE 3

| Ingredient | Example 4 (comparative) |
|---|---|
| Sodium Carboxymethyl Cellulose * | 68.9 g |
| Sodium Tripolyphosphate | 35 g |
| ACTICIDE MBP | 13.1 g |

* active 74% on dry matter; DS 0.72; moisture 6% wt; Brookfield ® viscosity LVT (6% sol. as dry matter, 60 rpm, 20° C.) 300 mPa*sec.

The dissolution velocity in a glaze slip of the two ceramic additives was evaluated.

Two glaze slips for tile-ware were prepared transferring in two 1000 ml jars the amount in g of the ingredients reported in Table 4.

TABLE 4

| Ingredient | Glaze 1 | Glaze 2* |
|---|---|---|
| Standard white glaze | 380 | 380 |
| Kaolin | 20 | 20 |
| water | 188 | 188 |
| Example 2 | 1.84 | — |
| Example 4 | — | 1.84 |
| Alumina grinding medium | 500 | 500 |

*Comparative

Both glaze slips were ground in a jar mill for 15 minute and then poured in a 1000 ml glass beaker.

The main parameters (Brookfield RVT viscosity, Ford Cup Viscosity, Density and % Residue) of the so obtained glaze slips were measured at 25° C.

The % residue was determined screening the two glaze slips with a tared 150 microns ASTM sieve (100 mesh) and determining the weight difference after drying in oven at 105° C. for 2 hours.

The result are reported in Table 5.

The results of the dissolution behavior tests show that the extruded pellets of the invention has a dissolution behavior comparable with that of a rheology modifier of the known art.

TABLE 5

| Property | Glaze 1 | Glaze 2* |
|---|---|---|
| Brook. RVT 0.5 rpm | 2400 mPa*s | 2600 mPa*s |
| Ford Cup Ø 4 mm | 35" | 36" |
| Density | 1,7951 kg/l | 1,7950 kg/l |
| % Residue | <0.1% | <0.1% |

*Comparative

Because of their physical characteristic the extruded pellets of the invention avoid the production of volatile dust when handled and allow simpler procedures for the preparation of the glaze slip, together with simpler and more precise dosage of the additives.

The invention claimed is:

1. A method for preparing ceramic glaze slips comprising using extruded pellets to prepare the ceramic glaze slips, the extruded pellets comprising:
    a) from 5 to 85% by weight as dry matter of a carboxymethyl cellulose (CMC), and
    b) from 5 to 85% by weight as dry matter of at least one other ceramic glaze additive,
wherein the sum of a)+b) represents at least 40% by weight of their dry matter, the pellets are used in an amount of from about 0.05% to about 5% by weight based on the weight of the ceramic glaze slip, and the extruded pellets are extruded through orifices having dimensions ranging from 1.0 to 6.0 mm.

2. The method of claim 1 wherein the extruded pellets comprise:
    a. from 20 to 75% by weight as dry matter of carboxymethyl cellulose;
    b. from 20 to 75% by weight as dry matter of at least one other ceramic glaze additive.

3. The method of claim 1 wherein the carboxymethyl cellulose has a degree of substitution of from about 0.5 and about 1.5 and a Brookfield LVT® viscosity, at 2 wt % in water, 60 rpm and 20° C., of from about 5 to about 30,000 mPa*s.

4. The method of claim 3 wherein the carboxymethyl cellulose has a degree of substitution of from about 0.6 to about 1.2 and a Brookfield LVT® viscosity, at 2 wt % in water, 60 rpm and 20° C., of from about 10 to about 15,000 mPa*s.

5. The method of claim 1 wherein the at least one other ceramic additive is selected from the group consisting of suspending agents, thickening agents different from carboxymethyl cellulose, preservatives, biocides, antifoams, dispersants, binders, deflocculants, leveling agents, plasticizers, de-airing agents and combinations thereof.

6. The method of claim 5 wherein the suspending agents are water-swellable clays selected from the group consisting of bentonite, montmorillonite, kaolinite, hectorite, attapulgite and smectite, and combinations thereof.

7. The method of claim 5 wherein the thickening agents different from carboxymethyl cellulose are selected from the group consisting natural water-soluble polymers, derivatized natural water soluble polymers, cellulose derivatives different from carboxymethyl cellulose, synthetic polymers, and combinations thereof.

8. The method of claim 5 wherein the dispersants are selected from the group consisting of water-soluble salts of low/medium molecular weight acrylic (co)polymers, polyphosphates, humic acids, lignin sulfonates, sodium silicates, sodium carbonate and combinations thereof.

9. The method of claim 5 wherein the biocides are selected from the group consisting of isothiazolin-3-one derivatives, o-phenyl phenol derivatives, p-chloro-m-cresol, pyrithione salts, parabens, formaldehyde releasers, and combinations thereof.

10. The method of claim 5 wherein the antifoams and/or de-airing agents are selected from the group consisting of aluminum stearate, ethylene/propylene oxide copolymers, polydimethyl siloxane, colloidal silica, mineral oils, and combinations thereof.

11. The method of claim 5 wherein the binders are selected from the group consisting of polyvinyl alcohols, polyvinyl acetate, partially hydrolyzed polyvinyl acetate, anionic polyacrylates, or polyacrylamides, polyurethanes, styrene/butadiene resins and combinations thereof.

12. The method of claim 5 wherein the plasticizers are selected from the group consisting of glycerol; sorbitol; glycols, (co)polymer ethylene oxide/propylene oxide; fatty acids, fatty amides; alkanol amines, fatty acid monoesters of glycerol or glycols, mono- or di-esters of phthalic acid and combinations thereof.

* * * * *